UNITED STATES PATENT OFFICE.

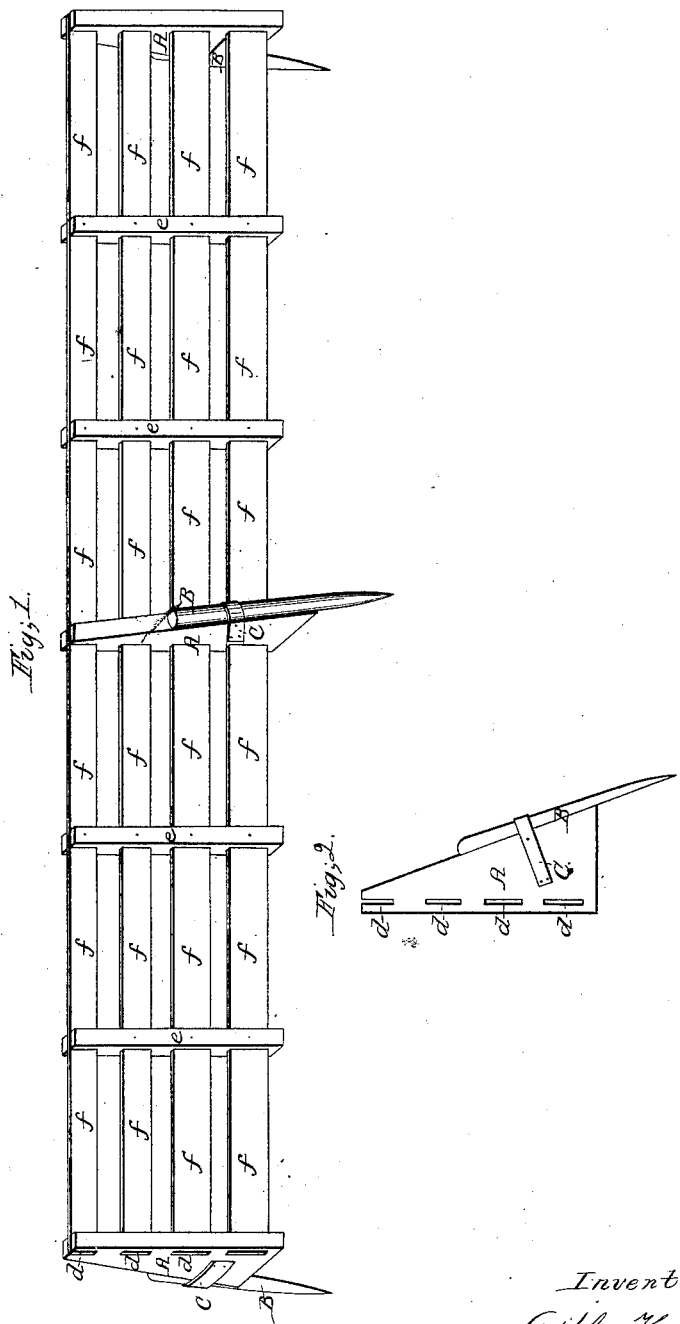

ASHLEY H. PALMER, OF SKANEATELES, NEW YORK.

IMPROVEMENT IN PORTABLE FENCES.

Specification forming part of Letters Patent No. 44,967, dated November 8, 1864.

*To all whom it may concern:*

Be it known that I, ASHLEY H. PALMER, of the town of Skaneateles, in the county of Onondaga and State of New York, have invented new and useful Improvements in Portable Fences; and I do hereby declare that the following is a full and exact description thereof, reference being had to the accompanying drawings, and to the letters of reference marked thereon.

The nature of my invention consists in applying a stake to be driven into the ground, passing close to the slanting side or edge of the post, and through a loop fastened upon the post to hold said stake closely thereto, so as to hold said post firmly in place upon the ground, and prevent the fence. which is supported thereby, from being easily overthrown.

To enable others skilled in the art to make and use my invention, I will proceed to describe its construction and operation.

I construct the fence-panel in the usual manner, as shown in the drawings, or in any other suitable manner, inasmuch as the shape or form of the panel in no wise affects the principle or operation of my invention.

Figure 1 represents a perspective view of two panels of fencing when in place upon the ground. Fig. 2 represents a side view of the post, with the loop affixed thereto and the stake driven into the ground and held by said loop firmly to the post.

A, Figs. 1 and 2, represents the post, which is made of wood, and is four feet six inches in height or length, two feet in width at bottom, and six inches in width at top, and made of two-inch plank, one edge thereof being perpendicular to the base thereof, and the other edge straight and slanting from top to bottom, as shown in the drawings. The exact size of the post, however, is in no wise material. Through this post, and near the straight edge thereof, holes are mortised to receive the ends of the boards or rails of the fence.

B, Figs. 1 and 2, represents the stake, which is driven into the ground to a sufficient depth to give to the post a firm support laterally. Upon the slant edge of the post a loop is formed, made of a strap of metal, of wire, or other suitable and strong material, and fastened to the post, substantially as shown at C, Figs. 1 and 2. Said stake is passed through this loop when driven into the ground, and is thereby held firmly and snugly to the edge of the post.

In setting up the fence for use the posts are placed with the slanting edge alternating, first upon the one and then upon the other side of the fence, so as to give it equal strength to resist any lateral or side pressure, from whichever side it may come, although the fence may be set up with the short edges of the posts all on one side of the fence, whenever it may for any reason be desirable to prevent the obstructions caused by the slanting edge of the posts protruding beyond the line of the fence upon the other side; but it will readily be perceived that in such case the fence will be more liable to give way to lateral pressure from the side upon which the stakes are driven, as the stakes will in that case all enter the ground in the same direction, and will not support each other as well as when driven into the earth in different directions, as is the case when the posts alternate as above described.

*d*, Fig. 2, represents the holes which are mortised through the posts near the perpendicular edge thereof, and into which the ends of the boards or rails pass. I chamfer the ends of the boards or rails, so that the fence may be made crooked or straight, as may be desired, as it will readily be perceived that when the ends of the boards or rails are chamfered they will, when pressed tightly together, completely fill the holes made in the posts to receive them, but when partially withdrawn the ends will become loosened, so as to allow the end of the panel to be moved out of the true line with the next panel, and thereby enable the person putting up the fence to vary the line thereof very considerably.

*e*, Fig. 1, represents the side bars, which are used to strengthen and hold the panel together when separated from the posts.

*f*, Fig. 1, represents the boards or rails of the panel.

Having thus fully described the manner of making and using my improvements, what I claim as my invention, and desire to secure by Letters Patent, is—

1. The use of the stake B, in combination with the post A, substantially as and for the purpose described.

2. The stake B, in combination with the loop C and post A, when arranged and constructed as herein described.

3. Chamfering the ends of the boards or rails which enter the posts, substantially as and for the purpose described.

ASHLEY H. PALMER.

Witnesses:
  DAVID WRIGHT,
  R. TRACY.